UNITED STATES PATENT OFFICE 2,352,852

SAPOGENIN TRANSFORMATION PRODUCTS AND PREPARATION OF SAME

Russell Earl Marker, State College, Pa., assignor to Parke, Davis & Company, Detroit, Mich., a corporation of Michigan No Drawing. Application May 15, 1941,
Serial No. 393,667

28 Claims. (Cl. 260—239.5)

The instant application is a continuation-in-part of my co-pending application Serial No. 317,419, filed February 5, 1940.

This invention relates to steroidal hormone intermediates and preparation of the same, and, more particularly, to the preparation of new steroidal sapongenin derivatives useful as intermediates for the manufacture of hormones.

One of the objects of this invention is to prepare new steroidal sapogenin derivatives which can readily be converted to pregnane derivatives.

A further object of this invention is the preparation, from these new steroidal sapogenin derivatives, of pregnane derivatives readily convertible into hormones such as those having progestational and cortical activity.

Other objects will be apparent from a perusal of this specification.

The steroidal sapogenins have, in general, the formula $C_{27}H_{44}O_{3-5}$, of which the portion $C_8H_{16}O_2$ is known to be present as a side chain attached to ring D of the steroid skeleton. Tschesche and Hagedorn (Ber. 68, 2247 (1935)) proposed the formula

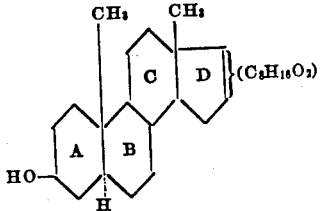

or

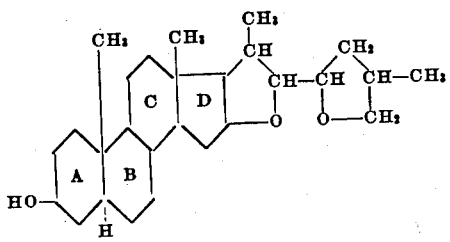

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have been shown to differ from tigogenin only in regard to the connections between ring A and B, the degree of saturation of the ring system, and the number of substituents attached to these rings.

These differences are shown below:

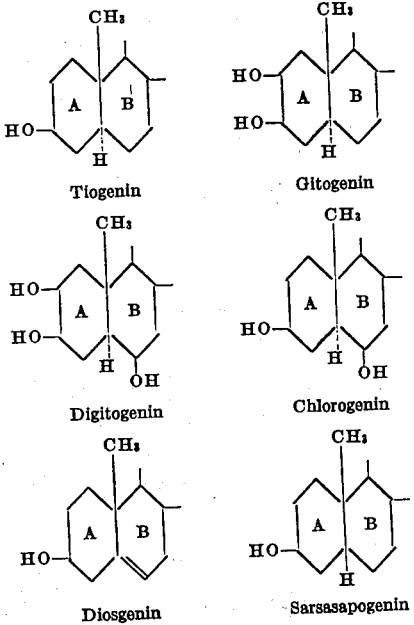

I have recently suggested (Marker & Rohrmann J. A. C. S. 61, 846 (1939)) that a more likely structure for the side chain of these steroidal sapogenins is that shown below.

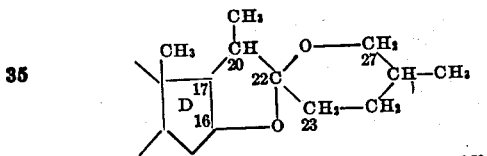

It is apparent that this formulation differs from that of Tschesche and Hagedorn in that the linkage, $C_{27}$—O—, is transferred from $C_{23}$ to $C_{22}$. However, a profound difference in the nature of the functional character of the side chain oxygen atoms is implied, for while the Tschesche-Hagedorn formula is that of an $\alpha,\alpha'$-di-tetrahydrofuryl derivative, the Marker-Rohrmann formula is that of a spiro-ketal.

For the purpose of greater clarification, the Marker-Rohrmann formulation of the side chain of the steroidal sapogenins will be used in describing the invention. It is to be understood, however, that the processes and products of the present invention may be obtained by the use of the methods herein to be described and these processes and products are claimed without any implications that the reactions and structures involved will ultimately be proved to be as represented herein.

It is known that when steroidal sapogenins such as sarsasapogenin, chlorogenin, etc., are refluxed at atmospheric pressure with acetic anhydride, the nuclear hydroxyl groups are acetylated, and the simultaneous occurrence of any other transformation has never been described. Thus, there are obtained sarsasapogenin acetate, chlorogenin diacetate, etc., of the formulae,

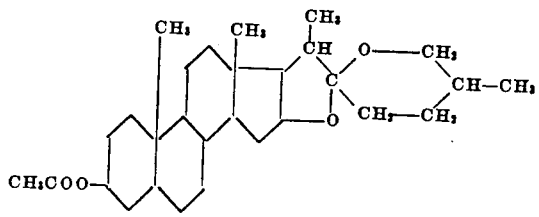

Sarsapogenin acetate

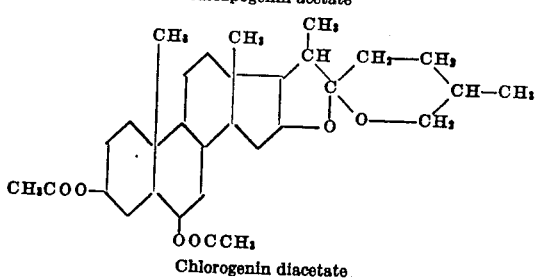

Chlorogenin diacetate

These acetylated steroidal sapogenins may be hydrolyzed, e. g. with acid or alkali, to regenerate the original sapogenins. Likewise, when p-nitrobenzoyl chloride and pyridine, succinic anhydride and pyridine, or other common acylating methods have been employed, the corresponding acylated sapogenins have been obtained, and it has been possible to hydrolyze these to the original sapogenins.

Now it has been found, however, that when the steroidal sapogenins are reacted with acidic agents, for example, with acylating agents such as acid anhydrides, under conditions more vigorous than those required merely for acylation, that new acylated steroidal sapogenin derivatives are formed which are not identical with acylated sapogenins obtained from the same reactants under milder conditions. The new compounds, on hydrolysis with alkali, do not regenerate the original steroidal sapogenins, but instead yield compounds isomeric with the sapogenins. I therefore designate the new free hydroxylic compounds as pseudo-sapogenins, (abbreviated, ψ-genins).

From the properties of my new ψ-genins and their esters, it appears that they have, attached to ring D, a new, altered, side-chain of the probable formula $C_8H_{15}O(X)$, which may be of one of the following types,

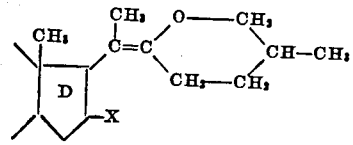

A

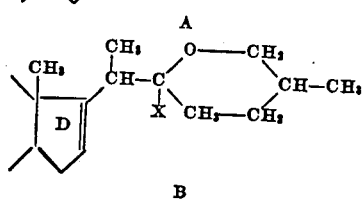

B

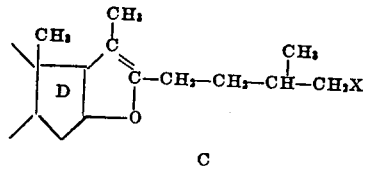

C where X is hydroxyl in the case of the pseudo-sapogenins, and an acyloxy group in the case of the acylated pseudo-sapogenins.

I have found that the pseudo-sapogenins, on refluxing with acids, e. g., alcoholic hydrochloric acid, are reconverted into sapogenins. On hydrogenation, pseudo-sapogenins yield exo-dihydro-pseudo-sapogenins. Both the pseudo-sapogenins and exo-dihydro-pseudo-sapogenins differ from the sapogenins in having a reactive or acylatable hydroxyl in the grouping attached to ring D. The pseudo-sapogenin compounds may be characterized as steroidal sapogenin derivatives having attached to the steroidal ring D an altered side chain of formula $C_8H_{15}O$—X which may be represented structurally as,

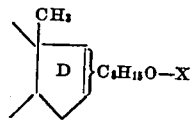

where X is a member of the class hydroxyl and groups capable of alkaline hydrolysis to give hydroxyl.

Where in the appended claims I have used the term pseudo-sapogenin, it is to be understood to refer to the new compounds having the properties set forth in the preceding three paragraphs.

I have also found that one can oxidize the pseudo-sapogenins or their acylated or side chain hydrogenated derivatives so as to obtain etio-bilianic acids and $C_{20}$-oxygenated pregnane derivatives. The latter compounds are not obtained when the sapogenins are oxidized. The products formed from the pseudo-sapogenins are dependent on the nature of the material oxidized and on the reaction conditions. Thus, the pseudo-sapogenins, on mild oxidation, e. g. at room temperature, with chromic anhydride in acetic acid, yield mostly $\Delta^{16}$-unsaturated - 20 - keto-pregnane derivatives, together with a smaller amount of the etio-bilianic acid derivative. The following formulae indicate this more clearly:

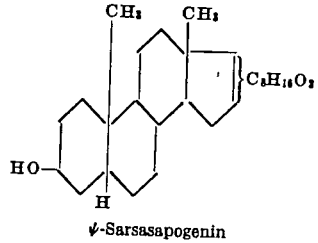

ψ-Sarsasapogenin

Oxidize mildly

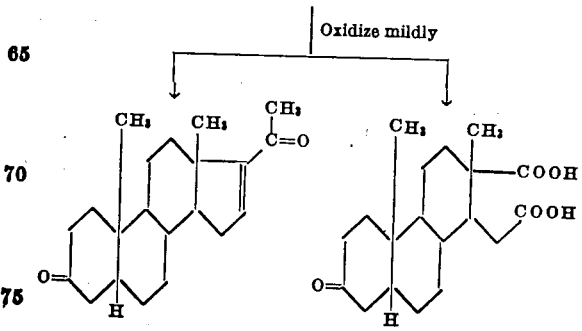

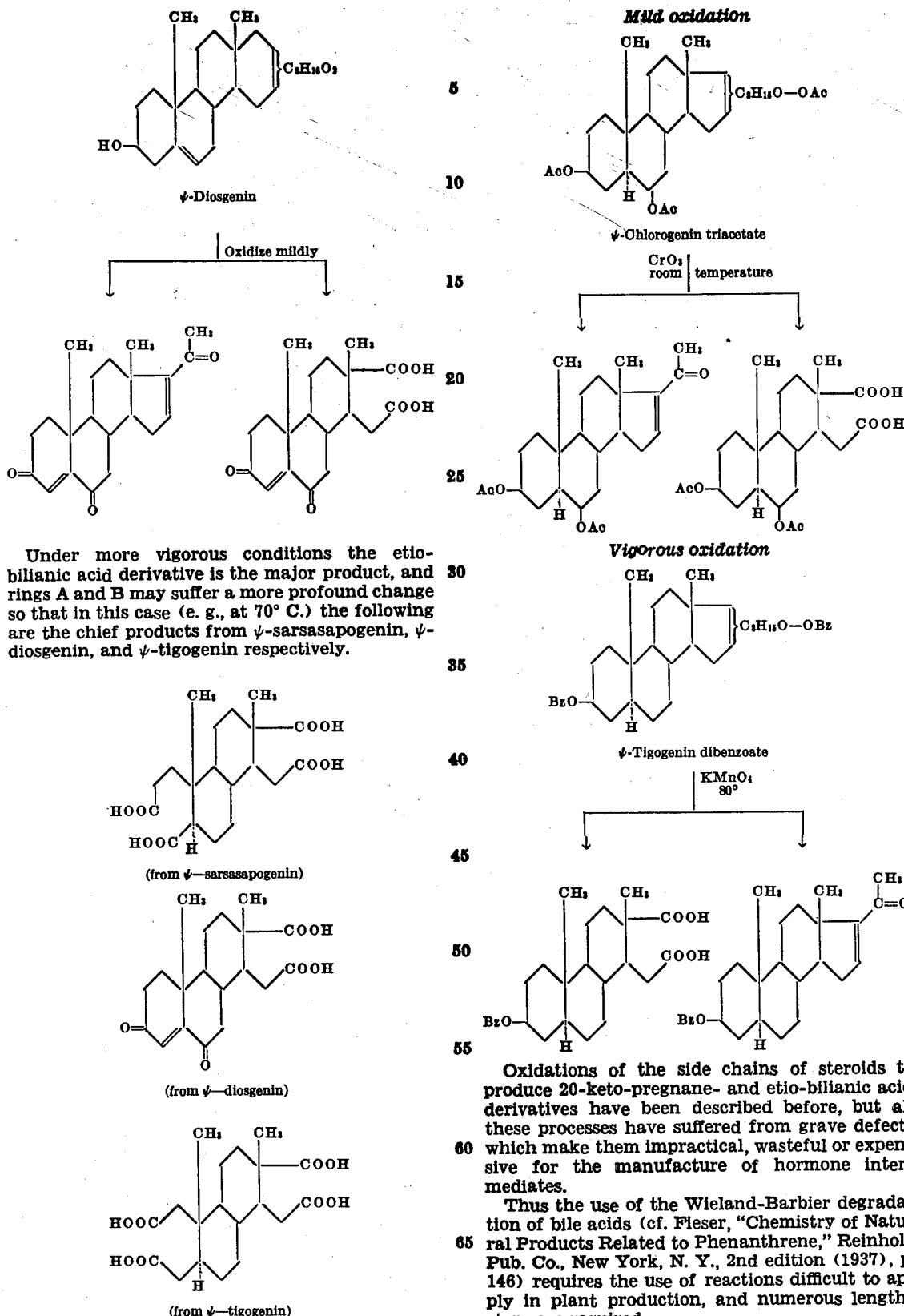

Under more vigorous conditions the etio-bilianic acid derivative is the major product, and rings A and B may suffer a more profound change so that in this case (e. g., at 70° C.) the following are the chief products from ψ-sarsasapogenin, ψ-diosgenin, and ψ-tigogenin respectively.

When the acylated ψ-genins are oxidized, rings A and B are not generally attacked as they are when the free hydroxyl compounds are oxidized. In other regards, the reaction proceeds as for the unacylated ψ-genins. E. g., Oxidations of the side chains of steroids to produce 20-keto-pregnane- and etio-bilianic acid derivatives have been described before, but all these processes have suffered from grave defects which make them impractical, wasteful or expensive for the manufacture of hormone intermediates.

Thus the use of the Wieland-Barbier degradation of bile acids (cf. Fieser, "Chemistry of Natural Products Related to Phenanthrene," Reinhold Pub. Co., New York, N. Y., 2nd edition (1937), p. 146) requires the use of reactions difficult to apply in plant production, and numerous lengthy steps are required.

The oxidation of the side chain of sterols like cholesterol is extremely wasteful and gives only very poor yields of 20-keto-pregnane derivatives.

The oxidation of sterols unsaturated in the side chain, such as stigmasterol and ergosterol leads to only poor yields of the desired products, and, furthermore, the starting materials are quite expensive.

On the other hand, the present process gives relatively high yields of the desired substances, the starting materials are relatively inexpensive, being comparable in price to the bile acids, and the reactions are clean-cut and give rise to no large amounts of by-products. These advantages are obtained because this process is entirely new and the presence of the oxygen atoms in the side chain are used to facilitate the desired degradation.

It is especially surprising that the ψ-genins should yield, on oxidation, $\Delta^{16}$-unsaturated-20-keto-pregnene derivatives, because double bonds are usually readily oxidized.

The $\Delta^{16}$-20-keto-pregnene derivatives may be reduced with the formation of 20-keto- or 20-hydroxy-pregnane derivatives, the products formed being determined by the nature of the reducing agent, and by the reaction conditions. Thus reduction using the combination of metallic zinc and acetic acid, or mild catalytic hydrogenation, e. g. in the presence of a palladium catalyst, results mainly in the formation of a 20-keto-pregnane derivative of the following structure at ring D,

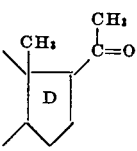

However, more vigorous conditions of reduction yield 20-hydroxy-pregnanes. Thus, reduction by sodium and alcohol, or by catalytic hydrogenation with Adam's platinum oxide catalyst, leads to the formation mainly of 20(α)-hydroxy-pregnane derivatives, or 20(β)-hydroxy-pregnane derivatives respectively. These compounds have the following structures:

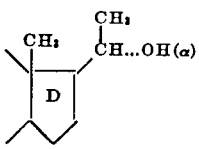

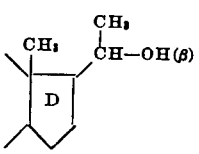

The two types of compounds illustrated by the formulae immediately above are epimers, i. e., they have opposite configurations about $C_{20}$. These epimers about $C_{20}$ are commonly differentiated diagrammatically as shown above (see further Marker et al. J. Am. Chem. Soc. 59, 2291 (1937)). This mode of designation is used throughout this specification.

Likewise, throughout this specification, epimers about $C_3$ will be designated α and β in accordance with the usage of Fieser, "Chemistry of Natural Products Related to Phenanthrene," Reinhold Pub. Co., New York, N. Y., 2nd edition (1937), p. 399.

My invention may be further illustrated by the following examples:

*Example 1*

(a) A mixture of 8 g. of sarsasapogenin acetate and 30 cc. of acetic anhydride is heated in a bomb tube at 195–200° C. for ten hours. The acetic anhydride is then evaporated in vacuo and the residual syrup hydrolyzed by refluxing it for thirty minutes with an excess of alcoholic potassium hydroxide. The alkaline solution is diluted with water and the precipitated solid taken up in ether. The ether is evaporated to a small volume and the white crystals collected, washed with ether, and recrystallized from ethyl acetate to give white needles, M. P. 171–173° C.

Anal. calcd. for $C_{27}H_{44}O_3$; C, 77.8; H, 10.6; mol. wt.=416. Found: C, 77.8, 77.9; H, 10.6, 10.5; mol. wt. (Rast), 440.

This product, which is pseudo-sarsasapogenin, forms a crystalline di-p-nitrobenzoate which may be crystallized from acetone as pale yellow crystals, M. P. 156.5–159° C. Pseudo-sarsasapogenin diacetate as commonly prepared, for example, by refluxing with acetic anhydride, is an oil which may be crystallized only with difficulty.

(b) The pseudo-sarsasapogenin diacetate obtained by refluxing 2.5 g. of pseudo-sarsasapogenin for thirty minutes with 15 cc. of acetic anhydride and then removing the acetic anhydride by evaporation in vacuo is dissolved in 60 cc. of acetic acid. The solution is heated on a steam bath while 5 g. of chromic anhydride in 50 cc. of 80% acetic acid is added over a period of one hour, during which the reaction temperature is maintained at about 90° C. Then 10 cc. of alcohol is added and the solution evaporated in vacuo to a volume of about 50 cc. Water is added and the precipitated solid taken up in ether. The ethereal extract is repeatedly shaken with 3% sodium hydroxide solution and then with water. The sodium hydroxide washings are combined and heated on the steam bath for about twenty minutes to complete the hydrolysis. The solution is then cooled, acidified with hydrochloric acid and the precipitated solid taken up in ether and crystallized from chloroform to give white crystals, M. P. 221–223° C., of 3(β)hydroxy-etio-biliansic acid which gives no depression with an authentic sample.

A sample of this acid, on refluxing with acetic anhydride and evaporation of the excess acetic anhydride, yields flat white needles, M. P. 204.5–206.5° C. of the acetate-anhydride of 3-(β)-hydroxy-etio-biliansic acid, identical with an authentic sample.

*Example 2*

(a) A mixture of 8 g. of sarsasapogenin and 30 cc. of propionic anhydride are heated in a bomb tube at 195–200° C. for ten hours. The propionic anhydride is then evaporated in vacuo and the residual syrup, pseudo-sarsasapogenin dipropionate, hydrolyzed with alcoholic sodium hydroxide. The alkaline solution is diluted with water, exhaustively extracted with ether and the latter evaporated to a small volume. The white crystals which separate are collected, washed with ether and recrystallized from ethyl acetate, giving white needles, M. P. 169–171° C. of pseudo-sarsasapogenin.

(b) To a solution of 1 g. of pseudo-sarsasapogenin in 30 cc. of acetic acid is added, at room temperature, a solution of 1 g. of chromic anhydride in 10 cc. of 80% acetic acid. After standing at room temperature for one hour, the solution is diluted with water and the precipitate taken up in ether. The ethereal solution is washed with water and 3% sodium hydroxide. Evaporation of the ether yields a solid which is crystallized from acetone giving large white plates, M. P. 200–202° C. of $\Delta^{16}$-pregnendione-3,20.

Anal. calcd. for $C_{21}H_{30}O_2$: C, 80.2; H, 9.6. Found: C, 80.0, 80.1; H, 9.4, 9.6.

With semicarbazide acetate in the known manner, this yields a di-semicarbazone which crystallizes from alcohol as white crystals, M. P. 310° C. with decomposition.

The alkaline washings obtained in working up the oxidation mixture may be treated as in Example 1 to obtain a small amount of 3-keto-etio-bilianic acid.

(c) To a boiling solution of 300 mg. of $\Delta^{16}$-pregnendione-3,20 in 100 cc. of absolute alcohol there is added, over a period of seventy-five minutes, 7 g. of sodium. The solution is diluted with water and the precipitated solid taken up in ether. The ethereal extract is washed well with water and the ether evaporated until crystals begin to separate. These are collected, washed with ether and crystallized from acetone to give small white crystals, M. P. 236–239° of pregnanediol-3($\alpha$),20($\alpha$), which do not depress the M. P. of an authentic sample. This pregnanediol is identical with that isolated from human pregnancy urine.

A sample of the pregnanediol thus prepared by the reduction of the unsaturated diketone is boiled with acetic anhydride and then the acetic anhydride removed in vacuo. The residue is crystallized from methanol and yields small white plates, M. P. 177–179° C. of the diacetate of pregnanediol-3($\alpha$),20($\alpha$). This acetate is identical with a sample prepared from known pregnanediol-3($\alpha$),20($\alpha$).

*Example 3*

(a) A mixture of 4 g. of sarsasapogenin acetate and 30 cc. of n-butyric anhydride is refluxed for eight hours. Then the excess anhydride is evaporated in vacuo. The syrup remaining behind is the 3-acetate-exo-butyrate of pseudo-sarsasapogenin.

This syrup is boiled for a short time with sodium hydroxide solution and then the alkaline solution is diluted with water, extracted with ether and the ethereal extract concentrated on a steam bath. The white crystals which separate are collected and washed with ether and recrystallized from ethyl acetate giving needles of M. P. 170–173° C. This is pseudo-sarsasapogenin, identical with that obtained as described in Examples 1 and 2.

(b) Three grams of the pseudo-sarsasapogenin as thus obtained are refluxed for twenty minutes with 12 cc. of acetic anhydride. The excess acetic anhydride is evaporated in vacuo and the residual syrup dissolved in 100 cc. of acetic acid. To this solution, at room temperature, is added 3 g. of chromic anhydride in 30 cc. of 80% acetic acid and the mixture allowed to stand at room temperature for one hour. Then water is added and the precipitated solid taken up in ether. The ethereal extract is washed with water and then thoroughly shaken with 3% sodium hydroxide solution. The ethereal extract and the alkaline solution are worked up separately as in the following paragraphs.

The alkaline water layer is boiled and then acidified with hydrochloric acid and the precipitated acid taken up in ether and crystallized from chloroform to give white crystals, M. P. 220–222° C. of 3-$\beta$-hydroxy-etio-bilianic acid. This acid gives no depression with a known sample of the acid.

The ethereal layer is evaporated and crystallized from aqueous methanol giving white plates, M. P. 144–146° C. of $\Delta^{16}$-pregnenone-20-ol-3($\beta$) acetate.

On hydrolysis with alcoholic potassium hydroixide, the $\Delta^{16}$-pregnenone-20-ol-3($\beta$) acetate yields the new unsaturated hydroxy ketone, $\Delta^{16}$-pregnenone-20-ol-3-($\beta$), which crystallizes from aqueous alcohol as white needles, M. P. 207–209° C. This product contains alcohol of crystallization. It may be freed of this by high vacuum sublimation and the $\Delta^{16}$-pregnenone-20-ol-3($\beta$) thus freed of alcohol of crystallization has M. P. 188–190° C.

(c) To a boiling solution of 500 mg. of the acetate of $\Delta^{16}$-pregnenone-20-ol-3-($\beta$), in 100 cc. of absolute alcohol there is added 6 g. of sodium over a period of one hour. The solution is cooled, diluted with water and extracted with ether. The ethereal extract is concentrated on a steam bath, and the crystals which separate are collected and washed with ether. After recrystallization from ether and then from acetone, compact white crystals of M. P. 180–183° C. are obtained. This substance is pregnanediol-3-($\beta$)-20-($\alpha$), and gives no depression in M. P. when mixed with a known sample.

On acetylation in the known manner with boiling acetic anhydride there may be obtained from this pregnanediol, a diacetate which crystallizes from aqueous alcohol as white needles, M. P. 138–140° C. which give no depression in melting point with a known sample of the diacetate of pregnanediol-3-($\beta$)-20-($\alpha$).

*Example 4*

A mixture of 2 g. of sarsasapogenin acetate and 12 g. of succinic anhydride is heated in a bomb tube at 195–200° C. for ten hours. The brown colored solid reaction mixture is refluxed for thirty minutes with an excess of methanolic potassium hydroxide. The mixture is diluted with water and the precipitated solid taken up in ether. After evaporation of the ether, the residual crystalline solid is clarified in alcohol with Norite and crystallized from ethyl acetate-acetone giving white needles, M. P. 169–172° C. This product is pseudo-sarsasapogenin identical with that prepared as described in the previous examples.

*Example 5*

(a) Sarsasapogenone is prepared in the known manner (Simpson and Jacobs, J. Biol. Chem., 109, 580 (1935)) by the oxidation of sarsasapogenin at room temperature with an equal weight of chromic anhydride in acetic acid solution.

(b) A mixture of 4 g. of sarsasapogenone and 30 cc. of acetic anhydride is heated in a bomb tube at 200° C. for ten hours. The acetic anhydride is removed in vacuo and the residue hydrolyzed by warming for one-half hour with an excess of alcoholic sodium hydroxide. Water and ether are added and the ethereal layer separated and washed with water and evaporated to dryness. The residue is decolorized in acetone solution with Norite and then crystallized from aqueous-acetone giving white needles, M. P. 165–166° C. This product is pseudo-sarsasapogenone.

With semicarbazide acetate in the usual manner, this substance forms a semicarbazone which may be crystallized from aqueous alcohol giving a product of M. P. 213–216° C. dec.

(c) To a solution of 1 g. of pseudo-sarsasapogenone in 30 cc. of acetic acid there is added a solution of 1 g. of chromic anhydride in 10 cc. of 80% acetic acid. After standing at room temperature for an hour, the solution is diluted with water and the precipitate taken up in ether. The ethereal solution is washed with water and 3% sodium hydroxide solution. Evaporation of the ether gives a solid product which may be recrystallized from acetone giving large white plates, M. P. 200–202° C. This is $\Delta^{16}$-pregnenedione-3,20, identical with that prepared as described in the earlier examples.

(d) A mixture of 700 mgs. of $\Delta^{16}$-pregnenedione, 120 cc. of absolute alcohol and 400 mgs. of Adams' platinum oxide catalyst is shaken in a hydrogen atmosphere at 40 lbs. pressure and at room temperature for fifteen hours. The catalyst is removed by filtration and the filtrate concentrated to a volume of about 20 cc. While still hot, there is added to this solution a hot solution of 1 g. of digitonin in 50 cc. of 90% alcohol. After standing for two hours at room temperature, the precipitated digitonide is concentrated, washed with alcohol and dried. The digitonide weighs about 750 mgs.

The filtrate, which contains the 3-($\alpha$)-hydroxy compounds, is evaporated in vacuo to a volume of about 10 cc. After cooling, 150 cc. of ether is added and the mixture filtered and the filtrate evaporated. The residue from this evaporation is crystallized from alcohol giving small compact white crystals, M. P. 232–234° C. of pregnanediol-3-($\alpha$)-20-($\beta$). This substance does not depress the M. P. of a known sample. The diacetate formed in the known manner with acetic anhydride may be crystallized from aqueous alcohol giving white needles, M. P. 108–109.5° C. This gives no depression in M. P. with a known sample of the diacetate of pregnanediol-3-($\alpha$)-20-($\beta$).

The digitonide is dissolved in 10 cc. of pyridine and warmed on a steam bath for an hour. The solution is colled, diluted with ether and the turbid mixture filtered. The filtrate is shaken with dilute hydrochloric acid and the ethereal layer separated and washed with water. The ether is evaporated on a steam bath and the residue, after treatment with Norite, is crystallized from aqueous alcohol giving compact white crystals of M. P. 173–175° C. This is pregnanediol-3-($\beta$)-20-($\beta$) and mixed M. P. determinations show no depression with an authentic sample.

*Example 6*

(a) A mixture of 2.5 g. of chlorogenin and 30 cc. of acetic anhydride is heated at 200° C. for ten hours. The acetic anhydride is then evaporated in vacuo and the syrupy residue hydrolyzed with hot alcoholic potassium hydroxide. The small white crystals which separate on dilution are collected and washed well with alcohol. The product thus obtained is pseudo-chlorogenin and after recrystallization from acetone has the M. P. of 268–270° C. It gives a large depression with a sample of chlorogenin. The substance is very sparingly soluble in acetone, ethyl acetate, ether, alcohol and similar solvents.

(b) Two grams of pseudo-chlorogenin are dissolved in 300 cc. of acetic acid and a solution of 2 g. of chromic anhydride in 20 cc. of 80% acetic acid is added at room temperature. After standing for about an hour, a small amount of alcohol is added and most of the acetic acid removed by vacuum distillation. The residue is dissolved in ether and washed well with water and dilute sodium hydroxide solution. The ethereal extract is evaporated to dryness on a steam bath and the residue recrystallized from alcohol. Thus there is obtained crystals of $\Delta^{16}$-allo-pregnenetrione-3,6,20, M. P. 226° C.

(c) Five-tenths of a gram of $\Delta^{16}$-pregnenetrione-3,6,20 is dissolved in 100 cc. of acetic acid and shaken in the presence of 0.5 g. of Adams' platinum oxide catalyst in a hydrogen atmosphere at about 40 lbs. pressure for three hours. Then the catalyst is removed by filtration and the acetic acid evaporated in vacuo. The residue may be crystallized from acetone to give allo-pregnanetriol-3,6,20 as white crystals. On oxidation with an equal weight of chromic anhydride in acetic acid solution at room temperature and working up the product, there is obtained allo-pregnanetrione-3,6,20 of M. P. 235° C.

*Example 7*

(a) One and a half grams of tigogenin is heated with 20 cc. of n-caproic anhydride in an oil bath at 220° C. for eight hours. Most of the caproic anhydride is then removed by distillation under reduced pressure and the residue is hydrolyzed by warming for a short time with an excess of alcoholic sodium hydroxide. The mixture is diluted with water and exhaustively extracted with ether. The ethereal extract is washed well with water and sodium hydroxide solution and then the ether is evaporated on a steam bath to leave a residue of pseudo-tigogenin. After crystallization from dilute acetone, the pseudo-tigogenin has M. P. 193–196° C.

(b) To 1 g. of pseudo-tigogenin in 100 cc. of acetone is added a solution of 1 cc. of concentrated sulfuric acid and 1 g. of sodium dichromate in 10 cc. of water. After standing for an hour, some methanol is added and most of the acetone removed on the steam bath. The residue is diluted with ether and water and the layers separated. The ethereal layer is washed with dilute sodium hydroxide solution and water. Then the ether is evaporated and the residue crystallized from slightly diluted acetone. This product, M. P. 207° C., is $\Delta^{16}$-allo-pregnenedione-3,20.

(c) 500 mgs. of $\Delta^{16}$-allo-pregnenedione-3,20 is shaken with 100 cc. of absolute alcohol and 0.5 gram of palladium on barium sulfate in hydrogen at 1 atmos. pressure for one hour. Then the catalyst is removed by filtration and the filtrate concentrated to a small volume on the steam bath. On dilution with water, crystals of allo-pregnanedione-3,20 separate. These may be recrystallized from acetone. The purified allo-pregnanedione-3,20 has M. P. 200° C.

*Example 8*

(a) A mixture of 2 g. of diosgenin, 30 cc. of benzoyl chloride and 15 g. of freshly fused sodium acetate is heated in an oil bath at 220° C. for ten hours. Then the mixture is distilled in vacuo until no more distillate can be collected at 200° C. and 10 mm. pressure. The residue in the distilling flask is cooled and alcoholic sodium hydroxide solution is added. After warming for one-half hour, the mixture is diluted with water and ether, and the layers separated. The ethereal layer is washed with water and dilute sodium hydroxide and then evaporated to dryness on a steam bath. This residue is pseudo-diosgenin. It may be purified by crystallization from slightly diluted alcohol and is thus obtained as white crystals M. P. 172–174° C. which readily decolorize bromine in acetic acid. The M. P. of pseudo-diosgenin is rather indefinite; sometimes preparations of M. P. 190–192° C. are obtained. It is believed that the M. P. 172–174° C. variety and the M. P. 190–192° C. variety are polymorphic forms.

(b) One gram of pseudo-diosgenin is dissolved in 100 cc. of acetic acid. Five cc. of sulfuric acid are added and then in small portions, and with constant stirring, there is added 1 g. of powdered potassium permanganate. After stirring for six hours at room temperature, sulfur dioxide is passed into the mixture with cooling until the solution is nearly colorless. The mixture is concentrated in vacuo to a small volume and then diluted with water and ether extracted. The ethereal layer is washed well with dilute alkali and water, and evaporated to dryness. The yellow residue may be recrystallized from acetone to give yellow crystals of $\Delta^{4,16}$-pregnadienetrione-3,6,20.

(c) To 200 mgs. of $\Delta^{4,16}$-pregnadienetrione-3,6,20 in 10 cc. of acetic acid is added 500 mgs. of zinc dust and the mixture heated for one hour on the steam bath. The mixture is diluted with water and extracted with ether and the ethereal extract washed well with water and dilute alkali. The ether is removed on the steam bath and the residue crystallized from slightly diluted methanol. This product is allo-pregnanetrione-3,6,20.

*Example 9*

(a) One gram of gitogenin is heated in a bomb tube with 20 cc. of acetic anhydride for ten hours at 200° C. The acetic anhydride is removed in vacuo and the residue warmed for one-half hour with an excess of alcoholic potassium hydroxide solution. Then the mixture is diluted with water and extracted with ether. The ethereal extract is washed with water and the ether evaporated on the steam bath. The residue is pseudo-gitogenin which may be purified by crystallization from methanol to give white crystals.

(b) Seven-tenths of a gram of pseudo-gitogenin are warmed on a steam bath with 5 cc. of nitric acid for one-half hour. The mixture is cooled, diluted with water and ether extracted. The ethereal extract is shaken with sodium hydroxide solution and the sodium hydroxide solution then acidified with dilute hydrochloric acid. The precipitate is collected, washed well with water and recrystallized from chloroform. The acid thus obtained is an etio-bilianic acid derivative in which ring A has been opened. It may be represented by the following formula,

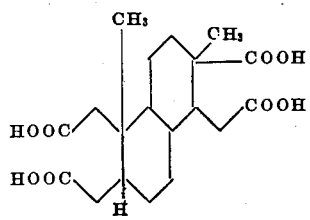

(c) When pseudo-gitogenin is acetylated and then oxidized with an equal weight of chromic anhydride in acetic acid at room temperature, and the reaction product worked-up as described in the previous examples, the major product is $\Delta^{16}$-allo-pregnenone-20-diol-2,3 diacetate.

*Example 10*

(a) A mixture of 2 g. of epi-sarsasapogenin acetate and 20 cc. of acetic anhydride is heated at 200° C. for ten hours in a sealed tube. The acetic anhydride is evaporated in vacuo and the residue hydrolyzed with hot ethanolic potassium hydroxide. The neutral fraction is crystallized from acetone as white needles of pseudo-epi-sarsasapogenin having M. P. 211–213° C.

(b) To a solution of 100 mg. of pseudo-epi-sarsasapogenin in 10 cc. of acetic acid is added a solution of 300 mg. of chromic anhydride in 8 cc. of 80% acetic acid. After standing at room temperature for one hour, water is added and the precipitate taken up in ether and washed free from acids with a solution of sodium hydroxide. The neutral fraction crystallized from acetone as white plates of $\Delta^{16}$-pregnenedione-3,20 having M. P. 199–201° C.

(c) A mixture of 250 mgs. of $\Delta^{16}$-pregnenedione-3,20, 120 cc. of absolute alcohol and 1 g. of palladium-barium sulfate catalyst is shaken with hydrogen at one atmosphere pressure and room temperature for ninety minutes. The catalyst is removed by filtration and the solvent evaporated in vacuo. The residue is crystallized from aqueous alcohol to give compact white crystals, M. P. 117–119° C. This is pregnanedione-3,20 and gives no depression in melting point when mixed with a known sample. The semicarbazone prepared in the known manner from semicarbazide acetate melts at 244° C., dec.

The palladium-barium sulfate catalyst may be prepared according to the directions given in Houben-Weyl, Arbeitsmethoden d. Organischen Chemie, 3rd ed. II, 323.

*Example 11*

(a) A mixture of 3.6 g. of tigogenin and 25 cc. of acetic anhydride is heated at 195–200° C. for eight hours. The solvent is removed in vacuo and the residue hydrolyzed with ethanolic potassium hydroxide. The neutral material is crystallized from aqueous acetone to give white crystals of pseudo-tigogenin having M. P. 193–196° C.

(b) To a solution of 1.5 g. of pseudo-tigogenin in 100 cc. of acetic acid is added a solution of 1.5 g. of chromic anhydride in 25 cc. of 90% acetic acid. It is allowed to stand at 25–28° C. for two hours, poured into water and extracted with ether. The ethereal solution is washed with 2% sodium hydroxide solution and the product remaining after evaporation of the ether is sublimed in a high vacuum at 120–125° C. This is crystallized from ether-pentane and finally from ether to give small white crystals of $\Delta^{16}$-allo-pregnenedione-3,20 having M. P. 210–212° C.

(c) To a solution of 200 mg. of $\Delta^{16}$-allo-pregnenedione-3,20 in 50 cc. of boiling absolute ethyl alcohol is added 4 g. of sodium in small pieces. After the sodium has dissolved, water is added and the product is extracted with ether. It is recrystallized from methanol and acetone, giving white crystals of allo-pregnanediol-3-($\beta$),20-($\alpha$) having M. P. 213–214° C.

On refluxing with acetic anhydride, this product gives an acetate which may be crystallized from methanol as white crystals, M. P. 166–168° C.

*Example 12*

(a) To a solution of 10 g. of diosgenin in a mixture of 500 cc. of dry toluene and 75 cc. of cyclohexanone is added 25 g. of aluminum isopropylate. After refluxing for ten hours, water and ether are added and the ethereal solution is washed well with dilute hydrochloric acid, and then with dilute sodium hydroxide. The ether is evaporated and the residue is steam distilled to remove cyclohexanone and its condensation products. The residual liquor is extracted with ether, and the ether evaporated to leave a residue which is crystallized first from pentane and then from ether-pentane, giving $\Delta^4$-tigogenenone of M. P. 186–188° C.

(b) A mixture of 6 g. of $\Delta^4$-tigogenenone and 25 cc. of acetic anhydride is heated in a bomb tube at 200° C. for ten hours. The excess acetic anhydride is removed in vacuo and the residue is heated for thirty minutes on a steam-bath with 500 cc. of a 1% alcoholic potassium hydroxide solution. Water is added and the product is extracted with ether. The ether is treated with Norite and evaporated, leaving a yellow oil, pseudo-$\Delta^4$-tigogenenone. This does not crystallize from the usual solvents, including aqueous solvents or ether–pentane.

A solution of 300 mg. of the oily pseudo-$\Delta^4$-tigogenenone in 10 cc. of methanol and 1 cc. of concentrated hydrochloric acid is refluxed for thirty minutes. Water is added and the product is extracted with ether, treated with Norite, and the solvent evaporated. The residue readily crystallizes from ether-pentane to give a pseudo-$\Delta^4$-tigogenenone product having M. P. 186–188° C.

(c) To a solution of 4 g. of the oily pseudo-$\Delta^4$-tigogenenone in 200 cc. of glacial acetic acid is added 50 cc. of a 90% solution of glacial acetic acid containing 4 g. of chromic anhydride. The temperature is kept at 25–28° C. for ninety minutes. Water is added and the product is extracted with ether and washed free of acids with water and dilute sodium carbonate solution. After removal of the ether, the residue is sublimed in a high vacuum at 130–133° C. The sublimate is crystallized from ether-pentane and from ether to a constant melting point of 182–185° C. The product is $\Delta^{4,16}$-pregnadienedione-3,20.

(d) A solution of 1 g. of $\Delta^{4,16}$-pregnadienedione-3,20 in 100 cc. of ether is added to 500 mg. of palladium-barium sulfate catalyst, and the mixture is shaken with hydrogen at room temperature under a pressure of five pounds for twenty minutes. The solution is filtered and the ether is evaporated. The residue is dissolved in 20 cc. of 60% acetone and allowed to stand at 0° C. overnight. The material which precipitates out is filtered off and the filtrate is extracted with ether. The ether is removed and the residue repeatedly crystallized from pentane and dilute acetone to give progesterone of M. P. 128° C.

(e) According to an alternative mode of reduction, $\Delta^{4,16}$-pregnadienedione-3,20 may be converted into allo-pregnanediol-3-($\beta$),20-($\alpha$) as follows: To a solution of 50 mgs. of $\Delta^{4,16}$-pregnadienedione-3,20 in 20 cc. of absolute ethyl alcohol there is added 20 g. of sodium in small pieces. The mixture is refluxed until the sodium has dissolved. Then water and ether are added and the ethereal layer separated and washed well with water. After removing the ether, the residue may be crystallized from dilute acetone to give allo-pregnanediol-3-($\beta$),20-($\alpha$) of M. P. 216° C.

*Example 13*

(a) Tigogenone is prepared by the oxidation of tigogenin with chromic anhydride in acetic acid at room temperature according to the method of Jacobs & Fleck J. Biol. Chem. 88, 548 (1930).

(b) Epi-tigogenin is prepared from this as follows: A mixture of 20 g. of tigogenone, 20 g. of aluminum isopropylate and 500 cc. of dry isopropyl alcohol is refluxed on a steam bath for eight hours. Then the mixture is slowly distilled through a short column over a period of four hours to a small volume. To this residue is added 20 g. of potassium hydroxide in 500 cc. of methanol and the whole is refluxed for fifteen minutes. Then the mixture is poured into water and acidified with hydrochloric acid. The precipitated solid is removed by extraction with ether and the ethereal extract thus obtained is washed well with water. The ethereal extract is evaporated to dryness on the steam bath and the residue dissolved in 1 liter of 95% alcohol. To this is added a boiling solution of 40 g. of digitonin in 3 liters of 95% alcohol. After standing for three hours at room temperature, the precipitated digitonide is collected and washed with alcohol. The alcoholic filtrate is concentrated to a volume of 500 cc. and 4 liters of ether are added. A small precipitate is filtered off and the ethereal filtrate washed well with water. Then the ethereal solution is evaporated to dryness on a steam bath and the residue crystallized from acetone, methanol and ethyl acetate to give epi-tigogenin of M. P. 242–245° C.

A solution of 100 mgs. of epi-tigogenin is refluxed with 5 cc. of acetic anhydride for thirty minutes. On cooling, the acetate of epi-tigogenin separates in the form of needles. These are collected, recrystallized from methanol and acetone, and then have M. P. 199–202° C.

(c) A mixture of 10 g. of epi-tigogenin and 25 cc. of acetic anhydride is heated in a sealed tube for ten hours at 200° C. Then the tube is opened and the excess acetic anhydride removed by distillation in vacuo. The residue is crude pseudo-epi-tigogenin diacetate and it may be purified by crystallization from ether-pentane.

The whole of the pseudo-epi-tigogenin diacetate obtained as described above is hydrolyzed by refluxing it for thirty minutes with an excess of alcoholic potassium hydroxide solution. The hydrolysate is diluted with water and the product isolated by extraction with ether and then evaporating the ethereal extract. The residue is crystallized from ether-pentane, and dilute acetone to give needles of pseudo-epi-tigogenin of M. P. 148–150° C.

(d) To a solution of 500 mgs. of pseudo-epi-tigogenin in 20 cc. of glacial acetic acid at 25° C. is added a solution of 500 mgs. of chromic anhydride in 5 cc. of 80% acetic acid. After the mixture has stood for an hour at 25° C. it is diluted with water and the product extracted with ether. The ethereal extract is washed with water and then thoroughly shaken with sodium hydroxide solution and finally washed again with water. After removing the ether on a steam bath the residue is crystallized from ether-pentane and finally from ether to yield $\Delta^{16}$-allo-pregnenedione-3,20 of M. P. 208–210° C.

*Example 14*

(a) Pseudo-epi-tigogenin is prepared for example as described in Example 13.

(b) A solution of 1.5 g. of pseudo-epi-tigogenin in 10 cc. of acetic anhydride is refluxed for thirty minutes. Then the excess acetic anhydride is removed in vacuo and the residue dissolved in 50 cc. of acetic acid. To this solution there is added slowly a solution of 1.5 g. of chromic anhydride in 15 cc. of 80% acetic acid while maintaining the temperature of the mixture at 25° C. After ninety minutes the solution is diluted with water and the precipitated material dissolved in ether. The ethereal layer is separated, washed with water and with sodium hydroxide solution. The ether is evaporated on a steam bath and the residue hydrolyzed by refluxing for ten minutes with an excess of 2% alcoholic potassium hydroxide solution. This mixture is diluted with water, extracted with ether and the ethereal extract washed well with water. After removing the ether on a steam bath the residue is crystallized from ether-pentane and from dilute methanol to give $\Delta^{16}$-allo-pregnenol-3-($\alpha$)-one-20 of M. P. 219–222° C.

One hundred mgs. of the above $\Delta^{16}$-allo-pregnenol-3-($\alpha$)-one-20 is refluxed for fifteen minutes with 2 cc. of acetic anhydride. Then the excess acetic anhydride is removed by distillation in vacuo and the residue crystallized from dilute methanol, thereby yielding $\Delta^{16}$-allo-pregnenol-3-($\alpha$)-one-20 acetate of M. P. 156–158° C.

(c) A solution of 200 mgs. of $\Delta^{16}$-allo-pregnenol-3-($\alpha$)-one-20 in 50 cc. of alcohol is shaken with 100 mgs. of platinum oxide catalyst under a pressure of three atmospheres of hydrogen for four hours. Then the catalyst is removed by filtration and the filtrate evaporated to dryness. The residue is dissolved in 20 cc. of acetic acid and a solution of 100 mgs. of chromic anhydride in 10 cc. of 90% acetic acid is added. After the mixture has stood at room temperature for thirty minutes, water is added and the mixture is extracted with ether. The ethereal extract is washed with water and with sodium hydroxide solution and then evaporated to dryness. The residue is crystallized from dilute methanol thereby yielding allo-pregnanol-3-($\alpha$)-one-20 acetate of M. P. 138–140° C.

This substance may be hydrolyzed with alcoholic potassium hydroxide to yield allo-pregnanol-3-($\alpha$)-one-20.

Allo-pregnanol-3-($\alpha$)-one-20 may also be prepared as follows: a mixture of 2 g. of $\Delta^{16}$-allo-pregnenol-3-($\alpha$)-one-20, 50 cc. of ethanol, 50 cc. of ether and 1 g. of palladium-barium sulfate catalyst is shaken at room temperature for three hours under pressure of 1.5 atmospheres of hydrogen. Then the catalyst is removed by filtration and the filtrate evaporated to dryness. The residue is crystallized from dilute alcohol and from dilute acetone to yield allo-pregnanol-3-($\alpha$)-one-20 of M. P. 171–174° C.

*Example 15*

A mixture of 9 g. of desoxysarsasapogenin and 40 cc. of acetic anhydride is heated in a sealed tube for ten hours at 200 C. Then the acetic anhydride is evaporated in vacuo and the residue hydrolyzed by refluxing it with an excess of alcoholic potassium hydroxide for thirty minutes. The mixture is diluted with water and the product extracted with ether. After removing the ether on a steam bath the residue is crystallized from aqueous acetone to give pseudo-desoxysarsasapogenin of M. P. 130° C.

*Example 16*

(a) $\Delta^{16}$-pregnenol-3-($\beta$)-one-20, is prepared, for example, as described in Example 3.

(b) A mixture of 300 mgs. of $\Delta^{16}$-pregnenol-3-($\beta$)-one-20, 300 mgs. of Adams' platinum oxide catalyst and 120 cc. of absolute alcohol is shaken with hydrogen at three atmospheres pressure and at room temperature for three hours. The catalyst is removed by filtration and the filtrate concentrated in vacuo. To the residue is added 50 cc. of acetic acid and the mixture is again distilled to dryness in vacuo. The residue is dissolved in 20 cc. of acetic acid and a solution of 300 mgs. of chromic anhydride in 4 cc. of 90% acetic acid is added. After standing at room temperature for an hour, the mixture is diluted with water and extracted with ether. The ethereal extract is washed well with dilute hydrochloric acid, water and dilute sodium hydroxide. After removal of the ether on the steam bath, the residue may be crystallized from aqueous alchohol to yield compact white crystals of pregnanedione-3,20, M. P. 118–119.5° C.

(c) When $\Delta^{16}$-pregnenol-3-($\beta$)-one-20 is oxidized without the preliminary reduction, the product obtained is $\Delta^{16}$-pregnenedione.

To a solution of 100 mg. of $\Delta^{16}$-pregnenol-3-($\beta$)-one-20 in 15 cc. of acetic acid there is added a solution of 150 mg. of chromic anhydride in 8 cc. of 80% acetic acid. After standing at room temperature for twenty minutes, water is added and the precipitated solid is taken up in ether and freed from acids by washing with dilute alkali. The ethereal layer is evaporated to dryness and the residue crystallized from acetone giving small white plates of $\Delta^{16}$-pregnenedione-3,20, M. P. 199.5–201° C.

*Example 17*

(a) Chlorogenone may be prepared by the oxidation of chlorogenin with chromic anhydride in acetic acid at room temperature according to the directions of Noller, J. Am. Chem. Soc. 59, 1092 (1937).

Alternatively, chlorogenone may be prepared as follows: to a solution of 10 g. of diosgenin in 1 liter of glacial acetic acid at 15–20° C. is added a solution of 10 g. of chromic anhydride in 100 cc. of 90% acetic acid. The mixture is allowed to stand at room temperature for one hour after which 20 g. of zinc dust is added in small portions. Then 20 cc. of water is added and the mixture is refluxed for five hours. At the end of this time, the mixture is filtered and the filtrate distilled in vacuo to remove the acetic acid. The residue is dissolved in ether and washed thoroughly with water and with 2% sodium hydroxide solution. The ethereal extract is concentrated to a small volume whereupon the product crystallizes. After recrystallization from ether, pure chlorogenone of M. P. 236–238° C. is obtained.

(b) A mixture of 20 g. of chlorogenone and 40 cc. of acetic anhydride is heated in a bomb tube at 200° C. for ten hours. Then the bomb tube is opened and the acetic anhydride removed by vacuum distillation. The residue is heated for thirty minutes with an excess of 2% alcoholic potassium hydroxide solution and then the resulting mixture is diluted with water and extracted with ether. After washing the ethereal extract well with water, it is evaporated on a steam bath and the residue crystallized from dilute acetone. This substance is pseudo-chlorogenone. It crystallizes with considerable difficulty. It may be represented by the following structural formula:

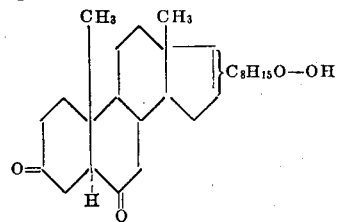

(c) To a solution of 5 g. of pseudo-chlorogenone in 500 cc. of glacial acetic acid is added a solution of 5 g. of chromic anhydride in 50 cc. of 90% acetic acid. The mixture is maintained at 25–28° C. for ninety minutes. Then 20 cc. of methanol is added and the mixture is concentrated in vacuo to a volume of 100 cc. The concentrated liquor is diluted with water and extracted with ether. Then the ethereal extract is washed well with sodium hydroxide solution and with water. After removing the ether on a steam bath the residue is crystallized from aqueous acetone to give $\Delta^{16}$-allo-pregnenetrione-3,6,20 of M. P. 223–226° C.

*Example 18*

The following example shows that the same pseudo-sapogenin is formed from either of the two sapogenins isomeric about $C_{22}$.

(a) Isosarsasapogenin may be prepared as described by Marker and Rohrmann, J. Am. Chem. Soc. 61, 846 (1939). It is identical with smilagenin which has been described by Askew, Farmer, and Kon, J. Chem. Soc., 1936, 1399. It is believed that isosarsasapogenin differs from sarsasapogenin only in regard to optical isomerism at $C_{22}$. See also Marker, Rohrmann & Jones, J. Am. Chem. Soc. 62, 1162 (1940), who have shown that neotigogenin bears the same relationship in the side chain to tigogenin that sarsasapogenin bears to isosarsasapogenin.

(b) A mixture of 3.3 g. of isosarsasapogenin acetate and 25 cc. of acetic anhydride is heated at 195° C. for nine hours. Then the excess acetic anhydride is removed by distillation under reduced pressure. The residue is hydrolyzed by refluxing it for thirty minutes with an excess of 2% alcoholic sodium hydroxide solution. The hydrolysate is diluted with water, extracted with ether and the ethereal extract washed well with water and with dilute sodium hydroxide. Then the ethereal extract is evaporated to dryness and the residue crystallized from acetone to give fine white needles of M. P. 169–172° C. This is pseudo-sarsasapogenin identical with that described in Example 1.

*Example 19*

(a) Pseudo-tigogenin is prepared, for instance, as described in Example 11a.

(b) The diacetate of pseudo-tigogenin is prepared by refluxing pseudo-tigogenin with five times its weight of acetic anhydride. After removing the excess acetic anhydride by evaporation under reduced pressure, there is obtained a syrupy residue of pseudo-tigogenin diacetate. Since it is crystallized only with difficulty, it is conveniently used in this syrupy form.

(c) Ten g. of pseudo-tigogenin diacetate is dissolved in 200 cc. of glacial acetic acid and cooled to 15° C. The solution is stirred vigorously while 6 g. of chromic anhydride in 50 cc. of 85% acetic acid is added at such a rate that the temperature does not rise above 25° C. After the addition of the chromic anhydride has been completed, the reaction mixture is maintained at 28° C. for ninety minutes. Then water is added and the mixture extracted with ether. The ethereal solution is washed well with water, with 3% sodium hydroxide solution and finally again with water. The ether is removed on a steam bath and the residue refluxed with a solution of 3 g. of sodium hydroxide in 200 cc. of alcohol for thirty minutes. This hydrolysate is diluted with water, extracted with ether and the ethereal extract washed well with water. After removing the ether on a steam bath, the residue is crystallized from dilute methanol and from ether to yield $\Delta^{16}$-allo-pregnenol-3-($\beta$)-one-20 of M. P. 192–194° C.

$\Delta^{16}$-allo-pregnenol-3-($\beta$)-one-20 may be oxidized to $\Delta^{16}$-allo-pregnenedione-3,20 without protecting the double bond at $\Delta^{16}$. This is illustrated by the following preparation: to a solution of 100 mgs. of $\Delta^{16}$-allo-pregnenol-3-($\beta$)-one-20 in 10 cc. of glacial acetic acid is added a solution of 50 mgs. of chromic anhydride in 5 cc. of 90% acetic acid. After the mixture has stood at room temperature for thirty minutes, water is added and the mixture is extracted with ether. The ethereal extract is washed well with water and then the ether is removed on a steam bath. The residue is crystallized from ether to yield $\Delta^{16}$-allo-pregnenedione-3,20 of M. P. 210–211° C.

*Example 20*

(a) A mixture of 5 g. of diosgenin and 25 cc. of acetic anhydride is heated in a bomb tube at 195–200° C. for an hour. Then the acetic anhydride is evaporated in vacuo to leave a residue which crystallizes after cooling. This residue may be recrystallized from methanol and then has a melting point of 97–101° C. It is pseudo-diosgenin diacetate.

Instead of using acetic anhydride in this step, the diosgenin may be heated to 200° C. for six to fifteen hours with propionic anhydride, butyric anhydride, valeric anhydride or any other carboxylic acid anhydride such as succinic anhydride, benzoic anhydride, etc. The yields are best with the lower aliphatic mono-carboxylic acid anhydrides.

Three g. of pseudo-diosgenin diacetate is refluxed with 150 cc. of 2% alcoholic sodium hydroxide for thirty minutes. Then water and ether are added, and the layers separated. The ethereal layer is washed with water, and then evaporated. The residue is crystallized from methanol and ether to give pseudo-diosgenin of M. P. 192° C.

(b) A solution of 4 g. of pseudo-diosgenin in 15 cc. of acetic anhydride is refluxed for thirty minutes. After evaporation of the acetic anhydride there remains a residue of pseudo-diosgenin diacetate. This residue is dissolved in 150 cc. of acetic acid and 5 g. of sodium acetate is added with warming. After solution is complete, the mixture is cooled to 15° and vigorously stirred while running in 9.6 cc. of a 1 molar solution of bromine in acetic acid. Then a solution of 4 g. of chromic anhydride in 50 cc. of 90% acetic acid is run in while maintaining the temperature of the reaction mixture at 25–28° C. After addition of the oxidizing agent is complete, the mixture is maintained at 25–28° C. for an additional ninety minutes. Then water is added and the mixture extracted with ether. To the ethereal extract is added 200 cc. of acetic acid and 5 g. of zinc and the mixture is distilled on a steam bath. After all the ether has distilled away, the mixture is diluted with water and extracted with ether. The ethereal extract is washed well with water and with sodium carbonate solution and then the ether is removed on a steam bath. The residue is treated with Girard's reagent in the usual manner to isolate the ketonic fraction. The ketonic syrup thus obtained is hydrolyzed by warming it for fifteen minutes with 5% alcoholic potassium hydroxide solution and the product isolated in the usual manner by dilution of water and extraction with ether. After removing the ether, the residual syrup is distilled in a high vacuum at 140° C. and the sublimate crystallized from acetone and ethyl acetate. Thus, there is obtained $\Delta^{5,16}$-pregnadienol-3-($\beta$)-one-20 of M. P. 212–214° C.

(c) To a solution of 275 mgs. of $\Delta^{5,16}$-pregnadienol-3-($\beta$)-one-20 in 100 cc. of absolute alcohol is added 8 g. of sodium in small portions. The mixture is refluxed until all the sodium has dissolved and then the solution is diluted with water, extracted with ether and the ethereal extract washed with water. After removing the ether on a steam bath, the residue is sublimed in a high vacuum at 120–130° C. The sublimate is crystallized from ether-pentane to give $\Delta^5$-pregnenediol-3-($\beta$)-20($\alpha$) which melts unsharply at 170–174° C.

Instead of reducing $\Delta^{5,16}$-pregnenol-3-($\beta$)-one-20 with sodium in alcohol as in the above paragraph, $\Delta^{5,16}$-pregnenol-3-($\beta$)-one-20 may be catalytically hydrogenated in the presence of a Raney nickel catalyst or a palladium-barium sulfate catalyst, thereby forming with either catalyst $\Delta^5$-pregnenol-3-($\beta$)-one-20 of M. P. 193° C.

*Example 21*

To a solution of 3 g. of pseudo-sarsasapogenin in 200 cc. of acetic acid there is added with stirring a solution of 6 g. of potassium permanganate in 500 cc. of 60% acetic acid. The temperature is maintained in 15° C. during this addition which should require fifteen minutes. Then the mixture is allowed to stand at room temperature for five hours, after which it is poured into water and extracted with ether. The ethereal extract is washed with water, thoroughly shaken with a 5% solution of sodium hydroxide, and then again with water. After removing the ether on a steam bath, the residue is decolorized with Norite in methanol and then crystallized from aqueous methanol. The product, $\Delta^{16}$-pregnenedione-3,20 has M. P. 194–196° C.

*Example 22*

A solution of 2 g. of pseudo-sarsasapogenin in 30 cc. of acetic anhydride is refluxed for fifteen minutes. Then the excess acetic anhydride is removed in vacuo and the oily residue is dissolved in 100 cc. of chloroform. A stream of ozone containing oxygen is passed through the solution at 0° C. for twenty minutes or until ozone is no longer absorbed by the solution. This may be determined by testing the effluent gas with starch-potassium iodide paper. After ozonization is complete, 10 cc. of acetic acid is added to the solution and it is steam distilled until no more steam-volatile material is carried over. Then the oily residue is dissolved in ether and the ethereal extract washed with water and with dilute potassium hydroxide solution. The ether is removed on a steam bath and the residue is sublimed in a high vacuum. The fraction sublimed between 150 and 185° C. contains the desired ketonic product.

These products are conveniently isolated in the following manner. The fraction subliming at 150–185° C. is refluxed for two hours with 1 g. of semicarbazide hydrochloride and 1.2 g. of sodium acetate in 20 cc. of alcohol. The mixture is diluted with water and the precipitated semicarbazone collected and purified by crystallization from methanol. The purified product, M. P. 237° C., thus obtained is the semicarbazone of $\Delta^{16}$-pregnenol-3-($\beta$)-one-20 acetate.

*Example 23*

Ozonized oxygen is passed through a solution of 3 g. of pseudo-sarsasapogenin in 150 cc. of chloroform at 0° C. until no more ozone is absorbed. Then 10 cc. of acetic acid is added and the solution steam distilled until no more steam-volatile material passes over. The oily residue is extracted with ether and the ethereal solution washed well with sodium carbonate solution and with water. The ether is evaporated and the residual syrup treated to obtain the ketonic fraction as follows: the residue is refluxed with 100 cc. of alcohol containing 2 g. of semicarbazide hydrochloride and 2.5 g. of sodium acetate for two hours. Then the mixture is cooled, diluted with ether and the ethereal solution repeatedly washed with water. After numerous washings with water have removed most of the alcohol from the ethereal layer, the desired semicarbazone precipitates at the interface of the ether-water layers. Then the mixture is filtered and the crude semicarbazone purified by crystallization from dilute alcohol. The purified product, M. P. 256° C., is the semicarbazone of $\Delta^{16}$-pregnenol-3-($\beta$)-one-20. It may be hydrolyzed with aqueous-alcoholic sulfuric acid to obtain $\Delta^{16}$-pregnenol-3-($\beta$)-one-20.

*Example 24*

(a) A mixture of 3 g. of tigogenone and 15 cc. of acetic anhydride is heated in a bomb tube at 200° C. for ten hours. At the end of this period the bomb tube is cooled and opened and the excess acetic anhydride removed by distillation under reduced pressure. The residue is pseudo-tigogenone acetate.

The above residue is refluxed for thirty minutes with 200 cc. of alcohol containing 5 g. of potassium hydroxide. Then water is added and the mixture is extracted with ether. The ethereal extract is washed with water and then the solvent is removed and the residue crystallized from dilute acetone and from methanol to give pseudo-tigogenone of M. P. 108–111° C. Pseudo-tigogenone is very soluble in ordinary solvents and therefore may be crystallized only with some difficulty.

(b) To a solution of 1 g. of pseudo-tigogenone in 50 cc. of glacial acetic acid is added 1 g. of chromic anhydride and 20 cc. of 90% acetic acid. The mixture is allowed to stand at 25–28° C. for ninety minutes. Then water is added and the mixture extracted with ether. The ethereal solution is washed with water and 3% sodium hydroxide solution. Then the ether is removed on a steam bath and the residue crystallized from ether-pentane and from ether to give $\Delta^{16}$-allo-pregnenedione-3,20 of M. P. 207–210° C.

(c) A solution of 200 mgs. of $\Delta^{16}$-allo-pregnenedione-3,20 in 100 cc. of acetic acid is shaken with 100 mgs. of Adams' platinum oxide catalyst under a pressure of 45 lbs. of hydrogen for three hours. The catalyst is removed by filtration and the filtrate is concentrated in vacuo. The residue is crystallized from alcohol to yield white crystals of allo-pregnanediol-3-($\beta$)-20-($\beta$) of M. P. 192–193° C.

*Example 25*

(a) $\Delta^{5,16}$-pregnadienol-3-($\beta$)-one-20 prepared for instance as described in Example 20, may be converted into its esters by treatment with acylating agents. Thus, 5 g. of $\Delta^{5,16}$-pregnadienol-3-($\beta$)-one-20 is refluxed with 30 cc. of acetic anhydride for a half hour. Then the excess acetic anhydride is removed by distillation under reduced pressure and the residue is crystallized from acetone or from somewhat diluted methanol to give $\Delta^{5,16}$-pregnadienol-3-($\beta$)-one-20 acetate of M. P. 174–176° C.

(b) To 1 g. of Δ$^{5,16}$-pregnadienol-3-(β)-one-20 acetate in 40 cc. of glacial acetic acid is added 1.5 g. of zinc dust. The suspension is heated for an hour on the steam bath. Then the solution is cooled, filtered and the filtrate poured into 100 cc. of water. After the precipitated solid has been allowed to stand for a short time to coagulate, it is collected and recrystallized from methanol. Thus, there is obtained Δ$^5$-pregnenol-3-(β)-one-20 acetate of M. P. 146–148° C.

Using essentially the same technique as that outlined in the above paragraph, the following transformations can be effected:

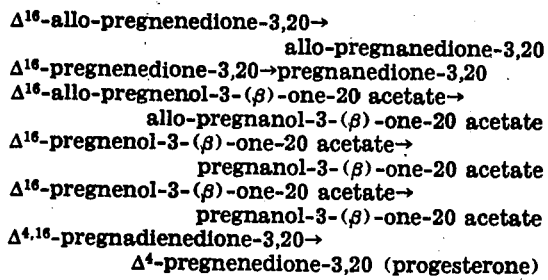

Δ$^{16}$-allo-pregnenedione-3,20→
    allo-pregnanedione-3,20
Δ$^{16}$-pregnenedione-3,20→pregnanedione-3,20
Δ$^{16}$-allo-pregnenol-3-(β)-one-20 acetate→
    allo-pregnanol-3-(β)-one-20 acetate
Δ$^{16}$-pregnenol-3-(β)-one-20 acetate→
    pregnanol-3-(β)-one-20 acetate
Δ$^{16}$-pregnenol-3-(β)-one-20 acetate→
    pregnanol-3-(β)-one-20 acetate
Δ$^{4,16}$-pregnadienedione-3,20→
    Δ$^4$-pregnenedione-3,20 (progesterone)

Example 26

Three g. of pseudo-sarsasapogenin is converted into the acetate by refluxing it for half an hour with 50 cc. of acetic anhydride. Then the excess acetic anhydride is removed by distillation under reduced pressure and the residual acetate is dissolved in 200 cc. of glacial acetic acid. To this solution is added 30 cc. of 30% hydrogen peroxide and then the mixture is heated at 70° for five hours. At the end of this time, the solution is concentrated by evaporation in vacuo and the residue poured into water. The oily-aqueous mixture is extracted with ether and the ethereal extract thus obtained washed well with water. The ether is evaporated on a steam bath and the residue is hydrolyzed by boiling it with an excess of methanolic potassium hydroxide solution for a half hour. This mixture is then poured into water, extracted with ether and the ethereal layer washed well with water. Then the ethereal extract is evaporated to dryness on a steam bath and the residue recrystallized from aqueous methanol. Thus, there is obtained Δ$^{16}$-pregnenol-3-(β)-one-20 of M. P. 180–183° C.

On refluxing with boiling acetic anhydride the above Δ$^{16}$-pregnenol-3-(β)-one-20 forms an acetate which after recrystallization from aqueous methanol has M. P. 140–141° C.

Example 27

A mixture of 10 g. of pseudo-tigogenin diacetate, 50 cc. of 30% hydrogen peroxide and 500 cc. of acetic acid is heated at 70° C. for six hours. Then water is added and the mixture is extracted well with ether. The ethereal extract is washed with water, the ether then evaporated on a steam bath, and the residue hydrolyzed by refluxing for a half hour with an excess of methanolic potassium hydroxide. The hydrolyzed mixture is poured into water and the aqueous mixture thus obtained is extracted well with ether. The ethereal extract is washed with water and then the ether is evaporated on a steam bath to leave a residue of crude Δ$^{16}$-allo-pregnenol-3-(β)-one-20.

The product is best isolated by acetylating the above crude residue by refluxing it for a half hour with an excess of acetic anhydride. Then the excess acetic anhydride is removed in vacuo and the residue crystallized from methanol repeatedly, thereby obtaining a fraction of M. P. 159–162° C. This is Δ$^{16}$-allo-pregnenol-3-(β)-one-20 acetate. The parent carbinol may be obtained from this in the usual fashion by hydrolysis, for example, with alcoholic potassium hydroxide.

The foregoing examples, illustrative of my invention, are subject to numerous variations in regard to the sapogenins employed, the conditions of reaction, the modes of removing the product from reaction mixtures, and the like. All of these variations, herein described and claimed fall within the scope of my invention.

Steroid sapogenins on which this invention may be practiced, include not only the aglycones of the naturally occurring steroidal saponins, but also their nuclear transformation products, i. e. the substances derived from the aglycone by changes in rings A and/or B which leave the side chain attached to ring D still intact and like that in the aglycones. Thus, this invention may be practiced on steroidal sapogenins, such as smilogenin, sarsasapogenone, 3-desoxysarsasapogenin, the sarsasapogonyl chlorides and the like.

Sapogenins having in the side chain either configuration with regard to C–22 (see further Marker, Rohrmann & Jones, J. Am. Chem. Soc. 62, 1162 (1940)) may be employed in practicing this invention, i. e. compounds having a side chain either of the type of sarsasapogenin or of the type of isosarsasapogenin may be acylated and isomerized with formation of pseudo-sapogenin compounds as set forth in this specification, and regardless of the configuration of the side chain of the sapogenin so treated, the structure of the pseudo-sapogenin compound is the same for both types of side chains. For example, sarsasapogenin and isosarsasapogenin yield the same pseudo-sarsasapogenin (compare Example 1 and Example 18).

Although the conversion of steroidal sapogenins to the pseudo-sapogenins is preferably accomplished by heating to 180–250° C. with an aliphatic acid anhydride such as butyric anhydride, this step may be accomplished by treatment with other acylating agents, for example by treating the sapogenin with an acid chloride such as benzoyl chloride in the presence of the salt of an organic acid, e. g. sodium acetate. Best results in the preparation of the pseudo-sapogenins are realized when the sapogenin is heated at about 200° C. with a lower fatty acid anhydride.

The oxidation of the pseudo-sapogenin compound may be accomplished on either the free pseudo-sapogenin or its exo-acylated derivative. While in the former case it is usually not necessary to hydrolyze the oxidation mixture to obtain the product, hydrolysis appears to be essential in the case of the oxidation of the acylated pseudo-sapogenin.

Oxidizing agents and conditions other than those illustrated in the examples may be used. Thus, potassium permanganate in acetic acid, chromic anhydride and acetic anhydride, potassium dichromate and sulfuric acid in aqueous acetone, nitric acid and the like have proved to be especially useful reagents for this transformation. If hydroxyl groups or double bonds are present in rings A and B of the pseudo-sapogenin compounds, these are usually attacked or altered in this step. Examples of transformations occurring in rings A and B in this step of oxidation have already been shown. In general, most satisfactory yields of the Δ$^{16}$-20-keto-pregnene compounds are obtained by conducting the oxidation below 50° C. with an oxidizing agent selected from the class consisting of permanganic and chromic acids and their salts. Particularly satisfactory results are obtained if the oxidation is conducted in acetic acid solution at 20–35° C. using chromic anhydride as the oxidant.

As the examples show, the relative amount of the etio-bilianic acid compound and the corresponding $\Delta^{16}$-20-keto-pregnene compound formed in a particular instance is determined by the reaction conditions, and may be controlled to yield a preponderance of either product. Generally, the $\Delta^{16}$-20-keto-pregnene compound is the major product at room temperatures, and conversely the major product at temperatures in the neighborhood of 50–100° C. is the etio-bilianic acid compound.

By pregnene or etio-bilianic acid compounds as herein described, I mean the compounds in the generic rather than the specific sense. While, for example, the term "pregnene" derivative is often used to mean those compounds having a configuration at $C_5$ like coprostane and sarsasapogenin, as distinguished from "allo-pregnene," which has a configuration at $C_5$ like cholestane and tigogenin, for convenience I use herein the term "pregnene" and "pregnene compounds" to mean both "pregnene" and "allo-pregnene" derivatives.

While the separation of the etio-bilianic acid compound and the $\Delta^{16}$-20-keto-pregnene compound, resulting from oxidation of my new compounds, is readily accomplished by extracting the former with aqueous alkali solutions from a solution of the mixture in a water-immiscible solvent, other means may also be used. For example, the products may be separated by fractional sublimation in a high vacuum, fractional crystallization, chromatographic adsorption, and so on.

The steroids having at ring D the structure

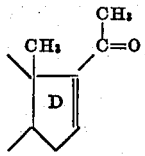

may be reduced, at least at the $\Delta^{16}$-double bond, according to a variety of methods involving treatment with a reducing agent of the class consisting of a metal more electro-positive than hydrogen in combination with a substance having a hydrogen atom reactive with said metal to form nascent hydrogen, and molecular hydrogen in combination with a noble metal catalyst, with production of a steroid having at ring D one of the formulae,

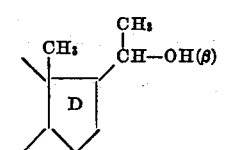

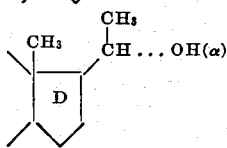

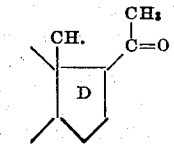

The mode of reduction may be so chosen that a preponderance of any one of these products may be obtained. If sodium or other alkali or alkaline earth metals are used with alcohols, water, dilute acids and the like, the chief product is usually the steroid having in ring D the structure

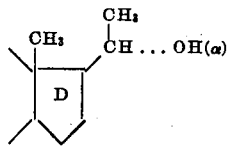

Reduction of the steroids having in ring D the structure

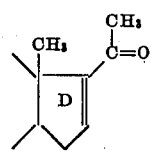

by means of catalytic hydrogenation in the presence of a palladium catalyst or by means of zinc and a lower fatty acid such as acetic acid yields a steroid having in ring D the structure

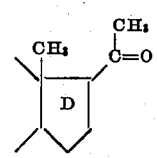

Under more vigorous conditions of catalytic hydrogenation, as for example, in the presence of a platinum catalyst, the product obtained is a steroid having in ring D the structure

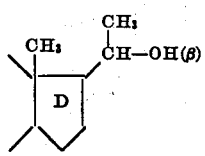

It will be appreciated that my invention comprehends a new and extremely useful class of substances valuable as intermediates in the preparation of steroidal hormones such as those having androgenic, progestational and cortical activity. These new substances of the present invention I have designated as pseudo-sapogenin compounds. They are characterized by having at ring D the structure,

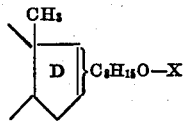

where X is a member of the class consisting of —OH and groups capable of alkaline hydrolysis to —OH. My pseudo-sapogenin compounds are further characterized in that: when X is —OH, the remainder of the steroid skeleton contains only such groups as are unaffected by mild alkaline hydrolysis; and when X is a group capable of alkaline hydrolysis to —OH, the remainder of the steroid skeleton contains only such groups as are unaffected by mild treatment with acylating agents.

A particularly valuable group of the new substances of my invention are pseudo-sapogenin compounds representable by the formula

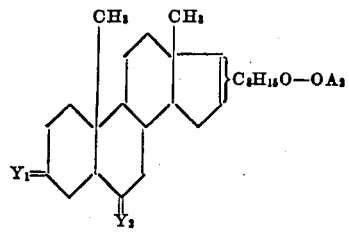

where $Y_1$ is a member of the class consisting of (=O) and

$Y_2$ is a member of the class consisting of (=O),

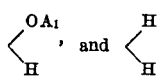

and $A_1$ and $A_2$ are members of the class consisting of hydrogen and acyl radicals of lower fatty acids, $A_1$ and $A_2$ being subject to the restriction that when either of $A_1$ and $A_2$ is hydrogen, the other likewise is hydrogen.

These substances are easily prepared from the aglycones of the readily available steroidal saponins such as sarsasaponin, dioscorea-saponin, and amolonin. The esters, ethers, and halogen derivatives comprehended within the above formulae are usually prepared from the corresponding free hydroxylic compounds by any of the known methods for converting a secondary alcohol into its esters, ethers, or halogen derivatives, care being taken that free mineral acid be absent; since mineral acid closes the pseudo-sapogenin ring with formation of the corresponding sapogenin. For example, the esters are made by reacting the hydroxylic compounds with carboxylic acid acylating agents such as acid chlorides, acid anhydrides and the like. Halides can be made for example by reacting the hydroxyl compound with a halogenating agent such as thionyl chloride, a phosphorous halide or the like, especially in pyridine solution. The halogen derivatives can, if desired, be converted by reaction with alkali metal alcoholates or alkali metal phenolates into the corresponding ethers. Ethers may also be made by condensing (especially in pyridine solution) the hydroxylic pseudo-sapogenins with highly reactive alkyl or aralkyl halides such as triphenylmethyl chloride, benzyl chloride and the like.

While I have described and illustrated certain forms of my invention and have set these forth in terms of a particular theory, I wish it to be understood that my invention is not to be limited to these forms nor is its operability in any way affected by the ultimate correctness of the particlar theory herein employed.

What I claim as my invention is:

1. The process for the preparation of steroidal compounds which comprises isomerizing and acylating the side chain attached to ring D of a steroidal sapogenin by reacting said sapogenin with an acylating agent at a temperature not substantially less than 180° C., with production of a pseudo-sapogenin acylated at least at the exo-hydroxyl group, and in either order subjecting said acylated pseudo-sapogenin to the steps of mild alkaline treatment and oxidation in the side chain attached to ring D, with production of steroids having the structures

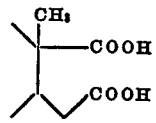

and

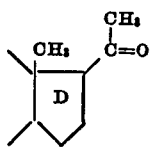

in the place occupied by ring D of the sapogenin used as a starting material.

2. The process for the preparation of steroidal compounds which comprises isomerizing and acylating the side chain attached to ring D of a steroidal sapogenin by reacting said sapogenin with an acylating agent at a temperature not substantially less than 180° C., with production of a pseudo-sapogenin acylated at least at the exo-hydroxyl group, and in either order subjecting said acylated pseudo-sapogenin to the steps of mild alkaline treatment and mild oxidation in the side chain attached to ring D, with production of a steroid having in ring D the structure

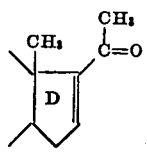

3. The process which comprises isomerizing and acylating the side chain attached to ring D of a steroidal sapogenin by reacting said sapogenin with an acylating agent at a temperature not substantially less than 180° C., with production of a pseudo-sapogenin acylated at least at the exo-hydroxyl group.

4. The process which comprises isomerizing and acylating the side chain attached to ring D of a steroidal sapogenin by reacting said sapogenin with a carboxylic anhydride at 175-250° C., with production of a pseudo-sapogenin acylated at least at the exo-hydroxyl group.

5. The process which comprises isomerizing and acylating the side chain attached to ring D of a steroidal sapogenin by reacting said sapogenin with a lower fatty acid anhydride at approximately 200° C. with production of a pseudo-sapogenin acylated at least at the exo-hydroxyl group.

6. The process which comprises subjecting a pseudo-sapogenin acylated at least at the hydroxyl group to hydrolysis with an alkaline reagent, with production of a pseudo-sapogenin unacylated at least at the exo-hydroxyl group.

7. The process which comprises subjecting a pseudo-sapogenin unacylated at least at the exo-hydroxyl group to treatment with an acylating agent, with production of a pseudo-sapogenin acylated at least at the exo-hydroxyl group.

8. The process which comprises subjecting a member of the class consisting of pseudo-sapogenin acylated at least at the exo-hydroxyl group and pseudo-sapogenins unacylated at least at the exo-hydroxyl group, to oxidation in the side chain attached to ring D, with production of steroids having the structures

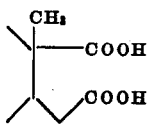

and

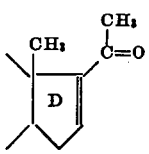

in the place occupied by ring D of the sapogenin used as a starting material.

9. The process which comprises subjecting a pseudo-sapogenin acylated at least at the exo-hydroxyl group to mild oxidation and hydrolyzing the oxidation product, with production of a steroid having in ring D the structure

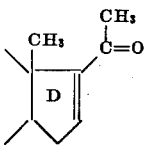

10. The process which comprises subjecting a pseudo-sapogenin unacylated at least at the exo-hydroxyl group to mild oxidation in the side chain attached to ring D, with production of a steroid having in ring D the formula

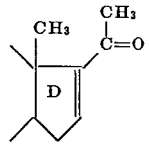

11. The process which comprises subjecting a pseudo-sapogenin acylated at least at the exo-hydroxyl group to mild oxidation by treating said acylated pseudo-sapogenin below 50° C. with an oxidizing agent of the class consisting of chromic and permanganic acid and their salts, and hydrolyzing the oxidation product, with production of a steroid having in ring D the structure

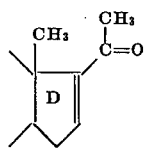

12. The process which comprises subjecting a pseudo-sapogenin unacylated at least at the exo-hydroxyl group to mild oxidation in the side chain attached to ring D by treating said pseudo-sapogenin below 50° C. with an oxidizing agent of the class consisting of chromic and permanganic acid and their salts, with production of a steroid having in ring D the structure

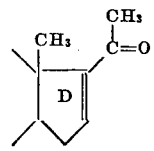

13. Process which comprises subjecting a steroid having in ring D the structure

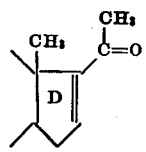

to reduction by means of a reducing agent of the class consisting of metallic zinc in combination with acetic acid, and molecular hydrogen in combination with a palladium catalyst, with production of a steroid having in ring D the structure

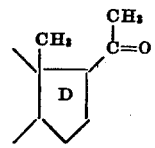

14. A pseudo-sapogenin compound characterized by having at ring D the structure,

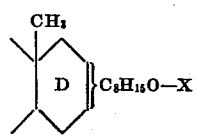

where X is a member of the class consisting of —OH and groups capable of alkaline hydrolysis to —OH, said pseudo-sapogenin compound being further characterized in that: when X is —OH, the remainder of the steroid skeleton contains only such groups as are unaffected by mild alkaline hydrolysis, and when X is a group capable of alkaline hydrolysis to —OH, the remainder of the steroid skeleton contains only such groups as are unaffected by mild treatment with acylating agents.

15. A pseudo-sapogenin compound representable by the formula

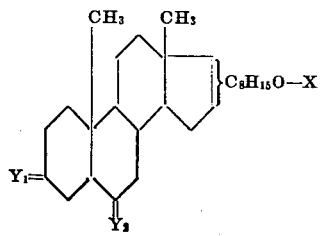

where X is a member of the class consisting of —OH and groups hydrolyzable to —OH; $Y_1$ is a member of the class consisting of (=O),

$Y_2$ is a member of the class consisting of (=O),

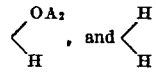

and $A_1$ and $A_2$ are members of the class consisting of hydrogen and acyl radicals of lower fatty acids, $A_1$ and $A_2$ being subject to the restriction that when either of $A_1$ and $A_2$ is hydrogen, the other likewise is hydrogen.

16. A pseudo-sapogenin representable by the formula

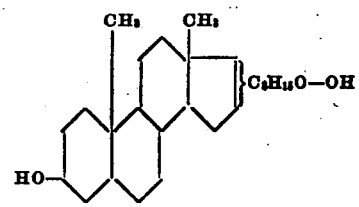

17. A pseudo-sapogenin representable by the formula

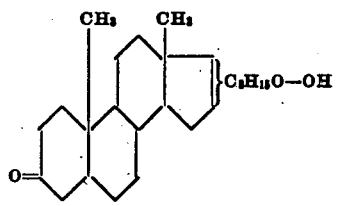

18. A pseudo-sapogenin representable by the formula

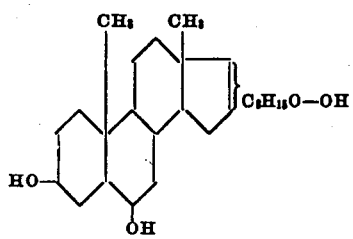

19. Pseudo-sarsasapogenin, having a M. P. of approximately 172° C.
20. Pseudo-sarsasapogenone, having a M. P. of approximately 165–166° C.
21. Pseudo-chlorogenin, having a M. P. of approximately 268–270° C.
22. Process which comprises subjecting a steroid of the formula,

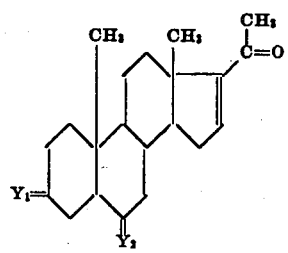

where $Y_1$ is a member of the class consisting of (=O),

$Y_2$ is a member of the class consisting of (=O),

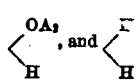

and $A_1$ and $A_2$ are members of the class consisting of hydrogen and acyl radicals of lower fatty acids, $A_1$ and $A_2$ being subject to the restriction that when either of $A_1$ and $A_2$ is hydrogen, the other likewise is hydrogen, to reduction by means of a reducing agent of the class consisting of metallic zinc in combination with acetic acid, and molecular hydrogen in combination with a palladium catalyst, with production of a steroid having the structure,

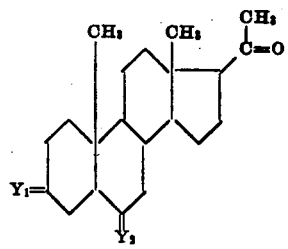

23. The process which comprises isomerizing and acylating the side chain attached to ring D of a steroidal sapogenin of the structure,

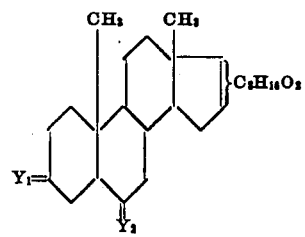

where $Y_1$ is a member of the class consisting of (=O),

$Y_2$ is a member of the class consisting of (=O),

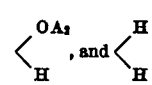

and $A_1$ and $A_2$ are members of the class consisting of hydrogen and acyl radicals of lower fatty acids, $A_1$ and $A_2$ being subject to the restriction that when either of $A_1$ and $A_2$ is hydrogen, the other likewise is hydrogen, by reacting said sapogenin with a lower fatty acid anhydride at approximately 200° C., with production of the corresponding pseudo-sapogenin acylate.

24. The process for preparing a pseudo-sarsasapogenin diacylate which comprises reacting sarsasapogenin with a lower fatty acid anhydride at approximately 200° C.

25. The process for preparing a diacylate of pseudo-sarsasapogenin which comprises reacting an ester of sarsasapogenin with a lower fatty acid anhydride at approximately 200° C.

26. Process according to claim 11 in which the pseudo-sarsasapogenin acylate oxidized is a lower carboxylic acid di-ester of pseudo-sarsasapogenin and in which the product obtained is $\Delta^{16}$-pregnenol-3-($\beta$)-one-20.

27. Process according to claim 12 in which the pseudo-sapogenin oxidized is pseudo-sarsasapogenin and in which the product obtained is $\Delta^{16}$-pregnenedione-3,20.

28. Process which comprises subjecting a steroid having in ring D the structure
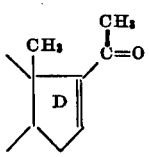
to reduction by means of molecular hydrogen in combination with a palladium catalyst, with production of a steroid having in ring D the structure
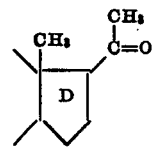
RUSSELL EARL MARKER.